Feb. 4, 1958 H. KERNEN, JR 2,821,828
FRUIT-SORTING MACHINE
Filed Sept. 3, 1953 2 Sheets-Sheet 1

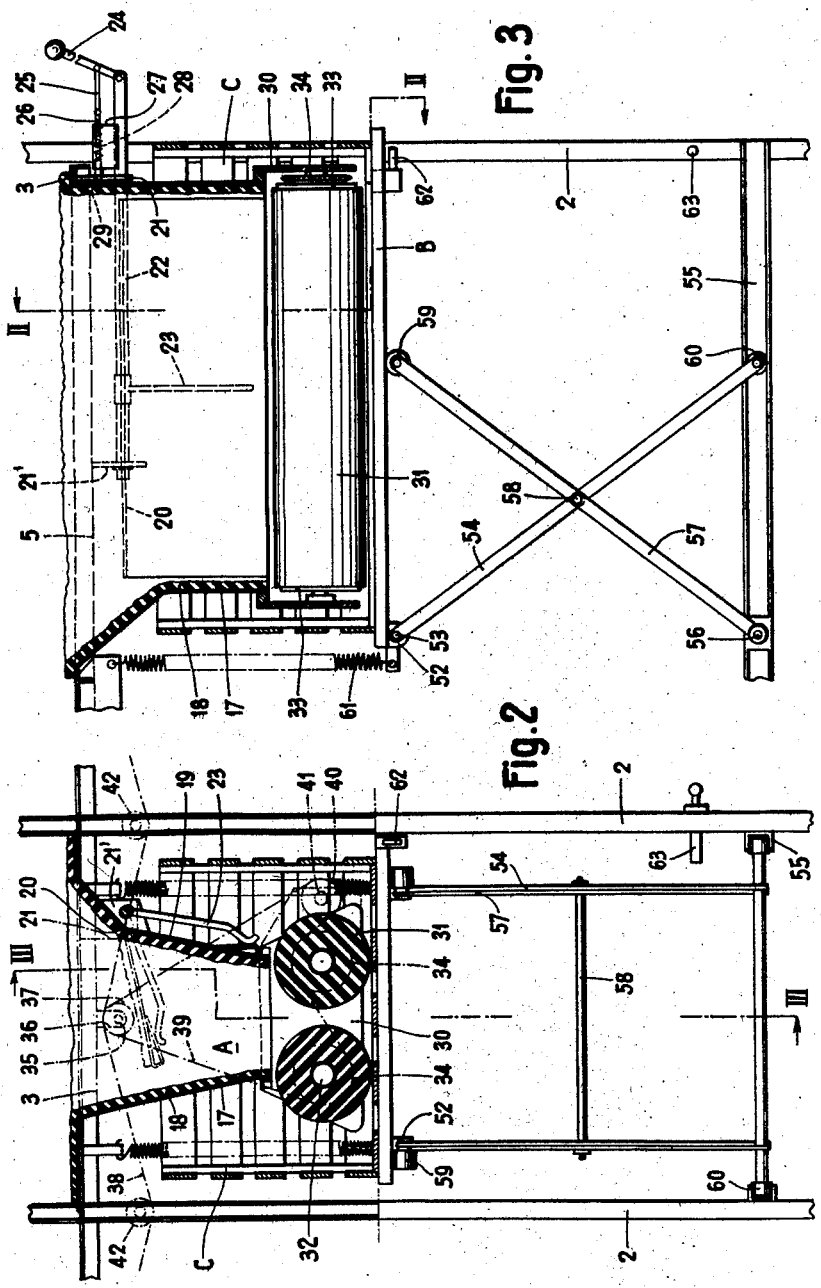

United States Patent Office 2,821,828
Patented Feb. 4, 1958

2,821,828
FRUIT-SORTING MACHINE
Hans Kernen, Jr., Bern, Switzerland
Application September 3, 1953, Serial No. 378,207
5 Claims. (Cl. 53—245)

My present invention relates to a fruit-sorting machine comprising an endless chain having small baskets mounted thereon of which each is adapted to receive a piece of fruit and to drop same according to its weight at one of several discharge stations which are disposed in tandem fashion in the direction of movement of the chain.

In known machines of this kind, the fruit drops into chutes made of wood or metal sheet, moves thereon laterally out of the machine and finally drops, with some momentum, into a crate. The fruit whereby may be severely affected and then no longer is suitable for storage purposes so as to substantially lower the value of the fruit.

My present invention aims at removing said disadvantage of prior-art fruit-sorting machines of the kind mentioned.

The fruit-sorting machine disclosed in my present invention comprises at each discharge station of funnel of which the inside is covered with sponge rubber and in the lower portion of which at least one roller covered with sponge rubber rotates so as to seize and depress the fruit dropping from the basket, and a platform for a crate disposed below each funnel, such platform being guided vertically movable and being suspended by spring means so as to gradually settle under the weight of the fruit filled into the crate by the roller.

One form of my present invention is shown in the accompanying drawings, in which:

Fig. 2 depicts a section of the machine in elevation and in a larger scale, partly in section on the line II—II of Fig. 3, and Fig. 3 is a cross-section on the line III—III of Fig. 2.

Figure 1:
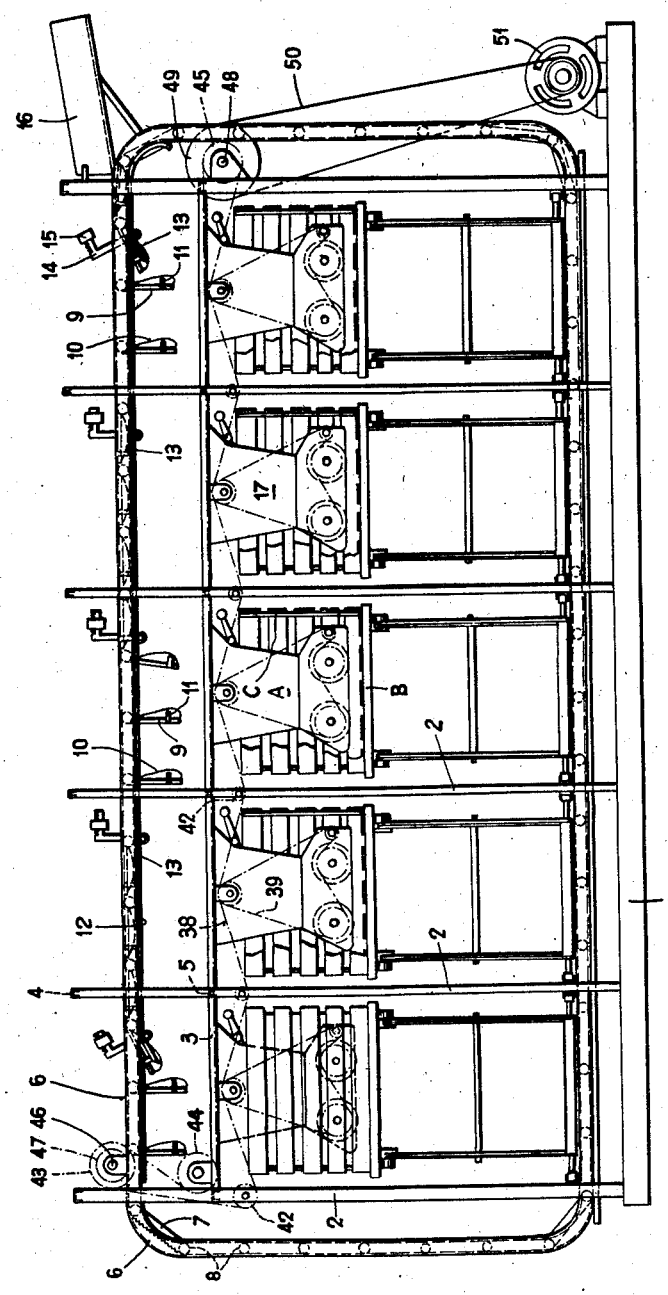
Fig. 1 is a schematic elevation of the machine.

The fruit-sorting machine shown comprises a welded frame which mainly comprises a base 1, posts 2, horizontal beams 3, upper cross-beams 4, intermediate cross-beams 5 and, on each longitudinal side, an endless rail 6 of U-shaped cross-section. In said rails run rollers associated with an endless chain of which the links are formed by racks 7. On each axle 8 of said chain are pivoted a series of basket frames 9 which are covered by a yarn net 10 and which, on one side and spaced from the appurtenant chain axle 8, are provided with a nose 11 tapered in the direction of movement of the chain. For each gang of tandem baskets, a bearing rail 12 is welded to said frame approximately at the elevation of the upper longitudinal portion of guide rail 6. Portions 13 of the rails 12 form downwardly swingable tongues to each of which is welded an arm 14 on which is movable a jockey weight 15.

The fruit to be sorted runs into the machine over an intake chute 16 or a conveyor belt, each piece of fruit being accommodated in a basket. As, owing to a corresponding adjustment of the jockey weights 15, the force necessary to depress the tongues 13 is greater in the vicinity of chute 16 than further to the rear, the heavier fruit drop from the baskets in front, i. e. near chute 16.

The fruit-sorting machine described so far is known in the art. The novelty disclosed by my present invention consists in the arrangement of catch funnels A for the fruit which drop from the baskets at the various points of discharge, and of platforms B for crates C into which drop the fruit which have passed through the funnels A. The details of such improvement are shown in Figs. 2 and 3.

To the longitudinal beams 3 and the traverses 5 are welded funnel bodies 17 made of metal sheet and which on their inner and upper sides are covered with sponge rubber 18. A sidewall 19 of each funnel body, which is of rectangular cross-section, is hingedly connected at 20 to the remaining funnel body portion. To the latter and to the pertinent beam 3 are welded bearing bosses 21 and 21' for the curved portion 22 of an operating lever of which one arm 23 is situated below or respectively behind the flap formed by funnel portion 19. The other arm, 24, is pivoted to curved portion 22 in the longitudinal direction thereof and through a connecting rod 25 connected to a small piston 26 which is mounted in a body 27 welded to portion 22 and through a spring 28 is urged against the adjacent bearing 21 which is made of metallic sheet. The latter is provided with two bores 29 into which the piston 26 may alternately snap for the purpose of arresting the lever 22 to 24 in one of two positions. In one of the latter, the sidewall 19 is folded downwardly, and in the other position it is folded upwardly so as to block the funnel passage.

To the lower edge of the narrow sides of the funnel are screwed bearings 30 which carry on their periphery a plurality of rollers covered with sponge rubber 31 and of which the core is formed by a hollow cylindrical shaft 32. The latter at its two ends is provided with plate discs 33 which retain the rubber 31 lengthwise of the roller. A sprocket 34 is secured to one of the two discs 33. To a strap 36 welded to beam 3 is secured a bearing pin 35 in parallel relation with the roller axles, and this pin carries a sprocket 37 having two toothed portions. A Gall's chain 38 is engaged to one of said toothed portions. Another chain, 39, passes over the second toothed portion of sprocket 37, the pinions 34 of the two rollers and over a guide sprocket 40. The latter is rotatable on a bearing pin 41 secured to bearing 30.

The chain 38 runs over the various pinions 37, guide rollers 42 mounted on the posts 2, over a sprocket 43 and a guide pinion 44 on the rear end of the machine, and over a driving pinion 45 on the front end of the machine. Sprocket 43 is fixed to a shaft 46 which at both ends is provided with pinions 47 engaging the links 7 of the chain which carries the baskets. The driving pinion 45 is fixed to the same shaft 48 as a pulley 49 which through a belt 50 is connected to the shaft of an electric motor 51. The latter thus rotates the pair of rollers (in opposite directions) arranged in the various funnels A, as well as the chain which carries the baskets.

The platform B disposed underneath each funnel A comprises an angle-iron frame and is guided vertically movable in the following manner. In the rear, as seen from the respective longitudinal side of the machine, straps 52 are welded thereto, to each of which is pivoted a link 54. On each of the lower cross-rails 55 of U-shaped cross-section is rotatably, but non-displaceably, mounted a composite shaft 56 which is connected to two links 57 which intersect the links 54 and through an axle 58 are rotatably connected thereto at half their length. The platform B in front is mounted on rollers 59 secured to the links 57. Underneath the platform, rollers 60 mounted on the links 54 run on the rails 55.

The platform B in the rear is suspended on tension springs 61 which are so dimensioned and prestressed as to be capable of raising the platform, together with the empty crates C set thereon, up to a short distance from the rollers of the funnel, as long as the crate is empty. When, however, the crate is being filled with fruit by the rollers, the platform together with the crate sinks so that, when the crate is full, it has reached its lowermost position. A pawl 62 pivoted to the front portion of platform B, then is engaged underneath a pin 63 secured to the adjacent post 2 and retains the platform in said lowermost position when the full crate is being exchanged for an empty one. Thereupon, the pawl 62 may be disengaged by hand or with the aid of a pedal so that the springs 61 again pull upwardly the platform together with the empty crate. During said crate-replacing operation the sidewall flap 19 is erected by means of lever 22 to 24 so that no fruit is conveyed downwardly by the rollers.

A more lengthy description of the new portion of the machine may be dispensed with, since the mode of operation thereof clearly springs from the description given above.

The improved machine disclosed herein affords the great advantage that the fruit dropping from the baskets is protected against bruises to a far-going degree, until it is situated in the crates.

Various alterations may be applied to the details of the machine. Thus, for example, it would be feasible to provide only one roller in each funnel, but to extend the opposite funnel sidewall downwardly adjacently thereto.

I claim:

1. Means suitable for delivering fruit in undamaged condition into crates or like containers, comprising frame structure including a platform support for a crate, means mounting said platform for movement under the influence of the weight of fruit delivered into the crate, resilient means resisting said platform movement but permitting said platform to gradually settle under the weight of fruit filled into the crate supported upon the platform, and funnel means for receiving fruit for deposit in said crate, said funnel means being supported on said frame structure so as to depend into the crate and said funnel presenting soft surfaced walls to fruit delivered thereinto, said platform being movable relatively to said funnel, said funnel including soft surfaced rotary means located in the path of fruit delivered into the funnel, said rotary means being formed and arranged to deliver the fruit into the crate.

2. Means as claimed in claim 1, said funnel including a swingable side wall and means engageable with said wall to swing the wall into an upwardly arrested position in which the funnel is closed to the delivery of fruit to said rotary means.

3. Means as claimed in claim 1, said chute being composed of rigid walls lined on the interior with a soft material such as sponge rubber.

4. Means suitable for loading fruit in undamaged condition into a crate or like container comprising frame structure and a crate support platform, means supporting said platform for vertical movement relatively to said frame structure, fruit receiving funnel structure, means supporting said funnel structure on said frame structure so that the funnel will depend into a crate removably supported upon said platform, means operatively associated with said platform for normally urging the platform into a raised position with respect to said funnel, said means being responsive to the weight of fruit loaded into the crate so as to permit the platform to gradually move downwards under the weight of the fruit, said funnel having a swingable side wall, and means engageable with said side wall and actuatable to move the side wall to an upwardly arrested position in which the funnel is closed to the passage of fruit therethrough.

5. Means suitable for loading fruit in undamaged condition into a crate or like container comprising frame structure and a crate support platform, means supporting said platform for up and down movement relatively to said frame structure, a fruit receiving funnel, means supporting said funnel from said frame structure so that the funnel depends into a crate removably supported on said platform, spring means connected between said platform and frame structure, said spring means normally urging said platform to a raised position with respect to the bottom of said funnel but permitting the platform to move gradually downwards by the weight of the fruit loaded into the crate, and rotary means at the bottom of the funnel and in the path of fruit delivered down the funnel, said rotary means being operative to load the fruit from the funnel into the crate, and guide rail structure beneath said platform, said platform support means comprising pivoted leg structure connected between the platform and said rail structure, said leg structure being collapsible under the weight of the fruit loaded in the crate and against the action of said spring means.

References Cited in the file of this patent

UNITED STATES PATENTS

| | | |
|---|---|---|
| 1,048,963 | Hart | Dec. 31, 1912 |
| 1,184,697 | Cutler | May 23, 1916 |
| 1,394,167 | Glasner et al. | Oct. 18, 1921 |
| 1,913,042 | Redlinger | June 6, 1933 |
| 1,961,479 | DeBeck | Jan. 5, 1934 |
| 1,987,916 | Thompson | Jan. 15, 1935 |
| 2,592,642 | Bardet | Apr. 15, 1952 |
| 2,603,383 | Wilson | July 15, 1952 |
| 2,647,670 | Cox | Aug. 4, 1953 |